United States Patent [19]
Anderson et al.

[11] Patent Number: 5,105,299
[45] Date of Patent: Apr. 14, 1992

[54] UNFOLDED OPTICS FOR MULTIPLE ROW DEFORMABLE MIRROR DEVICE

[75] Inventors: Charles H. Anderson; William E. Nelson, both of Dallas, Tex.

[73] Assignee: Texas Instruments Incorporated, Dallas, Tex.

[21] Appl. No.: 636,058

[22] Filed: Dec. 31, 1990

[51] Int. Cl.$^5$ ............... G02B 26/08; G01D 15/14
[52] U.S. Cl. .................................. 359/223; 359/196; 346/160
[58] Field of Search ............ 350/484, 486, 487, 6.1, 350/6.91, 286; 346/160, 160.1, 107 R, 108; 358/62

[56] References Cited

U.S. PATENT DOCUMENTS

| | | | |
|---|---|---|---|
| 3,912,386 | 10/1975 | Gorog et al. | 358/62 |
| 4,571,603 | 2/1986 | Hornbeck et al. | 346/160 |
| 5,041,851 | 8/1991 | Nelson | 346/108 |

Primary Examiner—Bruce Y. Arnold
Assistant Examiner—James Phan
Attorney, Agent, or Firm—Julie L. Schneider; James C. Kesterson; Richard L. Donaldson

[57] ABSTRACT

An optical system is described for combining separate deformable mirror device images into a single image. The resulting image is a single continuous image comprising left and right halves corresponding to the original individual images. The system is particularly useful for presenting DMD images to the printing drum of a xerographic process for letter quality documents. The combined image width allows a substantially greater printing width than was previously possible.

20 Claims, 3 Drawing Sheets

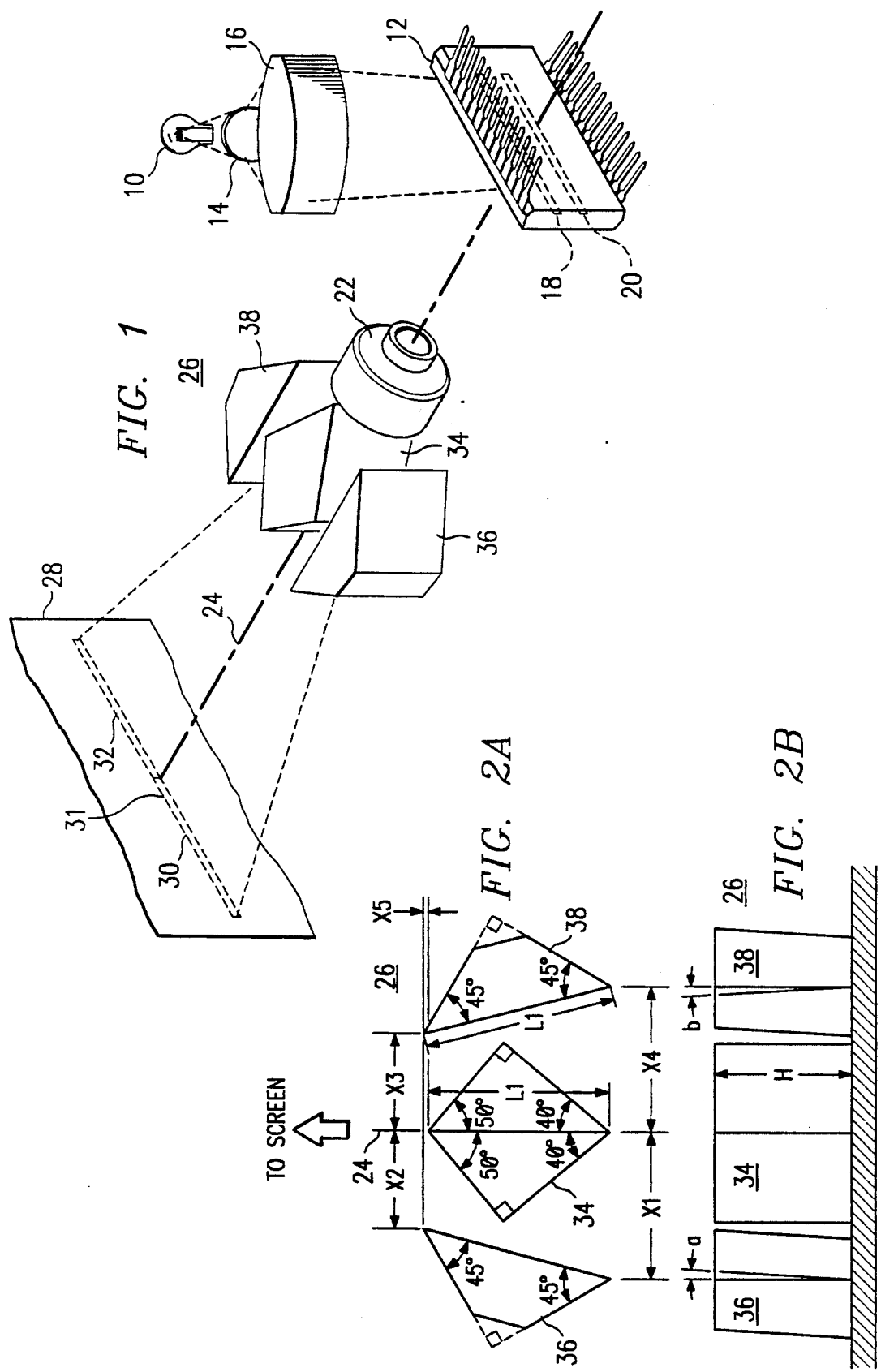

UNFOLDED OPTICS FOR MULTIPLE ROW DEFORMABLE MIRROR DEVICE

TECHNICAL FIELD OF THE INVENTION

This invention relates in general to the field of deformable mirror devices. More particularly, the present invention relates to a method and apparatus for optically projecting at least two rows of stacked DMD images such that the projected image is a single continuous image.

BACKGROUND OF THE INVENTION

A printing system has been designed which takes advantage of a spatial light modulator device to create a very simple exposure unit. The system uses a conventional light source such as a tungsten halogen light, and which is focused onto a deformable mirror device (DMD) consisting of a row or rows of individually deformable mirrors constructed on a single substrate.

The DMD is arranged in conjunction with a lens such that in the undeflected state, light reflecting from each mirror has a reflection angle such that the light is directed away from the remaining elements of the printing system. When a particular mirror is otherwise deflected, the angle of light reflection changes, and the light is then passed through the remaining system. The reflected light may, for instance, be directed to a photo receptor drum of a standard xerographic print process.

Present semi-conductor manufacturing processes are able to achieve DMD widths of up to 20 millimeters, containing approximately one thousand individual mirrors. These densities result in DMDs capable of illuminating a three-inch long strip at approximately 300 dots per inch (dpi) which is letter quality. Most printing applications, however, use formats wider than three inches. This requires a system designer to either lengthen the traditional 20 millimeter DMD row or to magnify the projected array such that a print density of less than 300 dpi results. The first alternative, producing an extended DMD, though theoretically possible, is prohibitively expensive. Producing a long DMD increases fabrication complexity of the DMD, poses difficult problems of uniform illumination, and often results in a non-uniform image even when properly illuminated. The second alternative, reducing the pixel print density, is not acceptable in those applications requiring letter quality print output.

Therefore, a need has arisen for a deformable mirror device system which is capable of illuminating an extended strip and which is easy to fabricate, illuminate and which results in uniform projections.

SUMMARY OF THE INVENTION

In accordance with the present invention, a deformable mirror device system is provided which substantially eliminates or reduces disadvantages and problems associated with prior deformable mirror devices.

An optical system is disclosed that combines and projects two images into a single continuous image. More specifically, an optical guide is described that accomplishes the combination-projection function. In one embodiment, the optical guide takes the form of a central silvered kite prism with tilted left and right prisms. In another embodiment, the optical guide consists of a semi-transparent beam splitter and a set of tilted reflecting surfaces. In yet another embodiment, the optical guide comprises an upper and lower pair of modified rhomboidal prisms.

It is one technical advantage of the disclosed invention to provide a simple system and method of creating wide DMD images with currently available narrow DMDs.

It is another advantage to produce wide DMD images with the high resolution necessary for high quality printing applications without increasing the physical width of the device.

It is a still further technical advantage of the invention to provide a wide resultant display from a plurality of parallel offset DMD pixel arrays.

BRIEF DESCRIPTION OF THE DRAWINGS

The foregoing objects, features, and technical advantages, as well as others, of the invention will be more apparent from the following description of the drawings in which like numbers refer to like members and in which:

FIG. 1 schematically shows a first embodiment of the disclosed invention;

FIGS. 2A and 2B depict, respectively, an above and forward view of the optical system disclosed in FIG. 1;

FIGS. 5, 6 and 7 depict forward and rear views of the optical system depicted in FIG. 4;

DETAILED DESCRIPTION OF THE INVENTION

Figure 3:
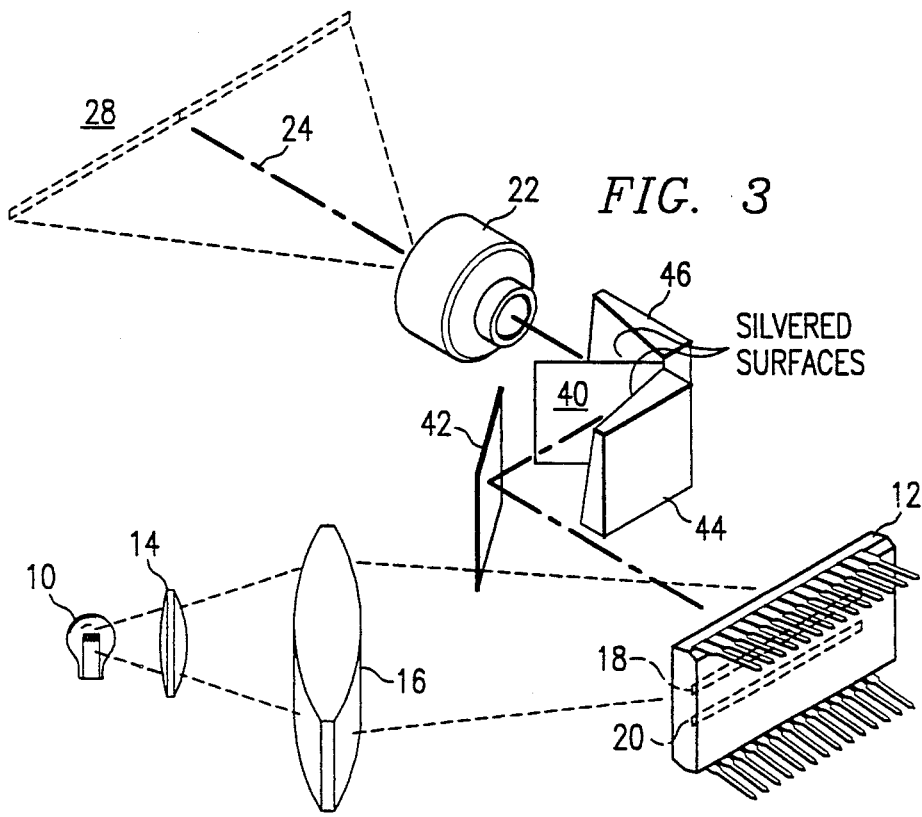
FIG. 3 depicts a second embodiment of the disclosed invention.

FIG. 1 depicts one embodiment of an optical system designed to project the images of two separate deformable mirror device ("DMD") rows 18, 20 onto screen 28 or plane such that the projected image forms a single continuous line 31.

Light source 10 illuminates DMD 12 through focusing lenses 14 and 16. DMD 12 contains two (or more) rows of individual mirror elements 18 and 20. Each of these rows contains approximately 1,000 small individual mirrors which may be electronically controlled by signals (not shown). Individual mirror rows 18 and 20 are shown on a single integrated chip substrate. Rows 18 and 20, however, may be on separate chips located generally near one another. Light from light source 10 reflects off rows 18 and 20 through imaging lens 22 along optical axis 24. DMD 12 is generally aligned so row 18 is above optical axis 24 and row 20 is below optical axis 24. Optical system 26 separates the images from rows 18 and 20 into a left and right channel, raises or lowers each channel as necessary and projects the two channels onto screen 28. By selecting the components of optical system 26 and imaging lens 22, the final size of the projected image may also be adjusted. The image on screen 28 forms a long single image 31 comprising a left half 30 and right half 32 corresponding to DMD rows 18 and 20 respectively. The operation of a typical DMD device can be seen in copending patent application entitled, "Spatial Light Modulator Printer and Method of Operation", Ser. No. 07/454,568, filed Dec. 21, 1989, which application is hereby incorporated by reference herein.

In one embodiment, optical system 26 comprises a central channel separator 34 aligned along axis 24 and left and right prisms 36 and 38. Channel separator 34 may comprise a set of four mirrors or an optical prism with four silvered surfaces. Prisms 36 and 38 are right angle isosceles prisms with each right angle milled off for packaging convenience.

Light rays reflected off DMD rows 18 and 20 enter imaging lens 22 and then are separated into left and right channels by the faces of channel separator 34 generally facing imaging lens 32. The separated images are then reflected outwards to prisms 36 and 38 where they are raised and lowered respectively and then redirected towards the two surfaces of channel separator 34 facing screen 28. The images are then projected from these latter two surfaces onto screen 28. By carefully choosing imaging lens 22, one contiguous image of DMD rows 18 and 20 can be projected to screen 28.

FIG. 2A more clearly shows the positioning of prisms 36 and 38 and channel separator 34. Channel separator 34 may consist of four mirrored surfaces, two modified silvered right angle prisms cemented together, or a single silvered kite prism, all having interior angles as indicated. Channel separator 34 has a length L1. Right angle prisms 36 and 38 have a hypotenuse length L2 and interior angles as indicated. Prism 36 and 38 are separated from channel separator 34 by distances X1, X2, X3, X4 and X5 as indicated in the drawing. The distances are measured at the base of the elements.

FIG. 2B depicts optical system 26 as viewed from imaging lens 22 (not shown) towards screen 28 (not shown). Prisms 36 and 38 are not mounted perpendicular to the base of channel separator 34. Prism 36 is tilted inwards towards channel separator 34 at an angle a. Prism 38 is tilted away from channel separator 34 at an angle b. Prisms 36 and 38 may be mounted, for example, by introducing shims between their base and a standard reference plane or by removing an angled portion of their respective bases during the manufacturing process.

It should be noted that for certain configurations the outside prisms may be positioned with a symmetrical tilt inward toward kite prism 34.

DMD rows manufactured on the same chip are typically 14 mm long by 0.036 mm tall and may be separated from one another by 6 mm. To combine and project such a combination onto a screen or surface approximately 250 mm distant with a magnification of 6.3×, the following dimensional parameters may be used:

Imaging lens
focal length=50 mm
diameter=35 mm
X1=44.5 mm
X2=35 mm
X3=35 mm
X4=44.5 mm
X5=1 mm
H=44 mm
Angle a=1.5 degrees
Angle b=1.5 degrees
L1=64 mm
L2=64 mm It should be understood that the particular embodiment associated with the above parameters is presented solely for purposes of teaching the present invention and should not be construed to limit the scope of the present invention to this or any embodiment.

FIG. 3 depicts a second embodiment of the disclosed invention to combine images from DMD rows 18 and 20. Light source 10 reflects off DMD 12 after passing through focusing lenses 14 and 16. The reflected image is then directed to a beam splitter 40 after being reflected off a plane mirror 42. Beam splitter 40 is partially reflective, partially transparent to electromagnetic radiation emitted by light source 10 causing a portion of each of the DMD images to be reflected towards angled first surface mirror 44 and transmitted towards angled first surface mirror 46. Beam splitter 40 is located at a 45° angle to optical axis 24 created by imaging lens 22. Mirrors 44 and 46 are aligned at approximately a 90° angle to one another as indicated in the drawing. It should be understood that mirrors 44 and 46 may take numerous forms, including plane mirrors and silvered prisms. The reflective faces of prisms 44 and 46 are tilted away from and towards beam splitter 40 respectively. After the separated image is raised and lowered by prisms 44 and 46 it is recombined at beam splitter 40 and transmitted to screen 28 via imaging lens 22. By carefully choosing imaging lens 22, one connected image of DMDs 18 and 20 appear on screen 28.

Figure 4:
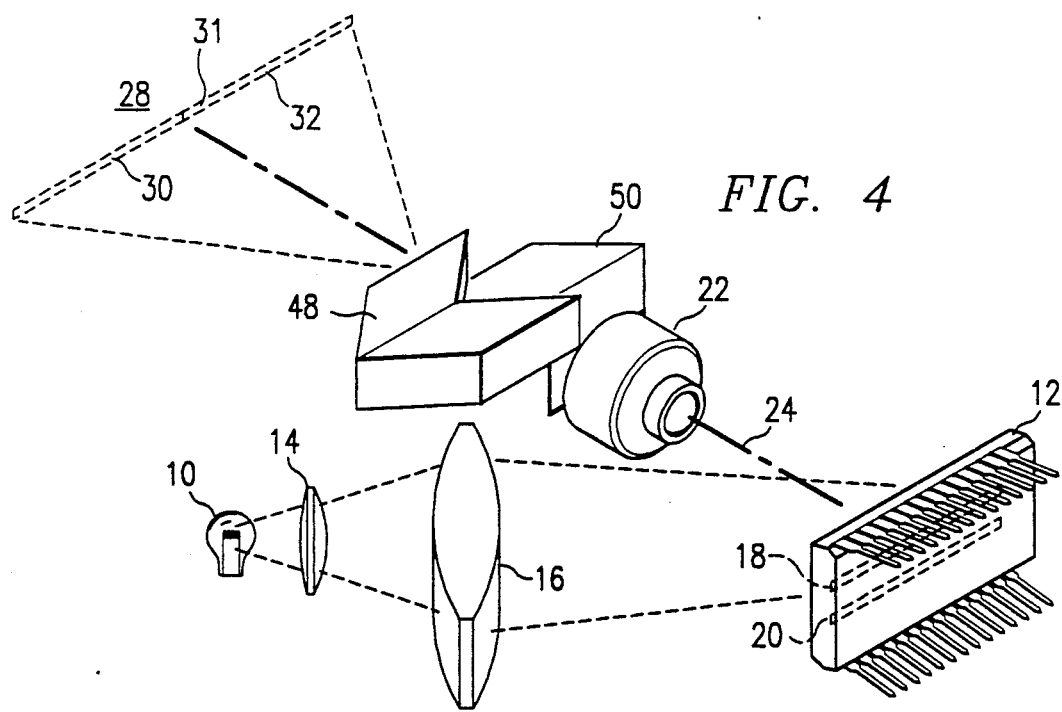
FIG. 4 depicts a third embodiment of the disclosed invention.

FIG. 4 depicts a third embodiment of the disclosed invention. Again light source 10 illuminates DMD 12 after passing through focusing lenses 14 and 16. The reflected images from rows 18 and 20 are focused by imaging lens 22 along optical axis 24. Rhomboidal prisms 48 and 50 separate the reflected image into an upper and lower channel, lower the upper channel and raise the lower channel, and recombine the two channels into images 30 and 32 on screen 28. By carefully choosing imaging lens 22, one connected image of DMDs 18 and 20 appear on screen 28.

Figure 5:
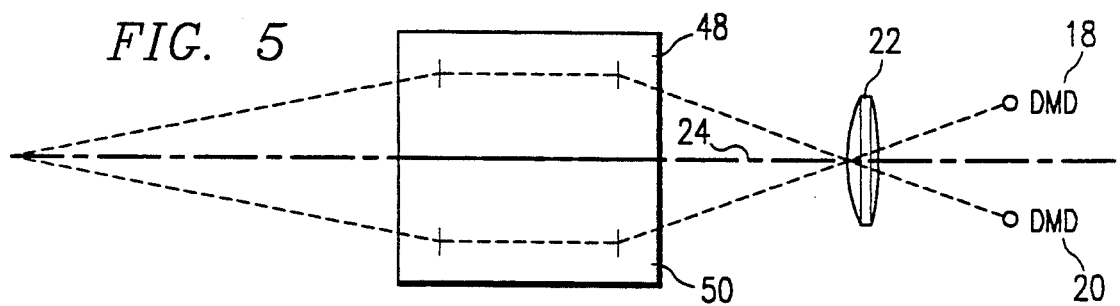
FIG. 5 depicts a cross-sectional view of the optical system depicted in FIG. 4.

FIG. 5 shows a cross-sectional view of rhomboidal prisms 48 and 50 and imaging lens 22. Imaging lens 22 inverts the reflected image from DMD rows 18 and 20 before the images enter rhomboidal prisms 48 and 50. Rhomboidal prisms 48 and 50 are aligned such that the surface formed by the upper surface of prism 50 and the lower surface of prism 48 ("boundary plane") coincides with optical axis 24 and is generally parallel to DMD rows 18 and 20. The surfaces of prisms 48 and 50 are angled to recombine images of DMD rows 18 and 20 into a single continuous row.

Figure 6:
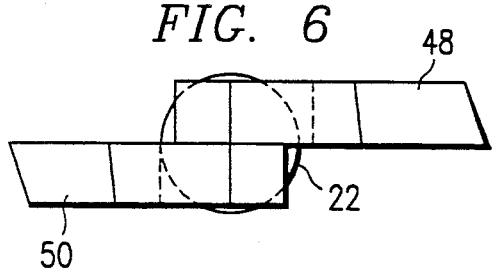

FIG. 6 depicts a view of prisms 48 and 50 as viewed from screen 28. Imaging lens 22 is partially visible.

Figure 7:
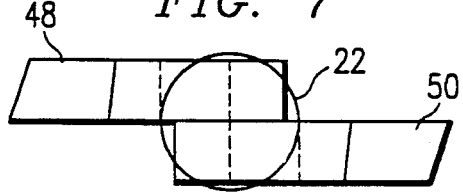

FIG. 7 depicts prisms 48 and 50 as viewed from DMD 12. Imaging lens 22 is positioned between DMD 12 and prisms 48 and 50.

Figure 8:
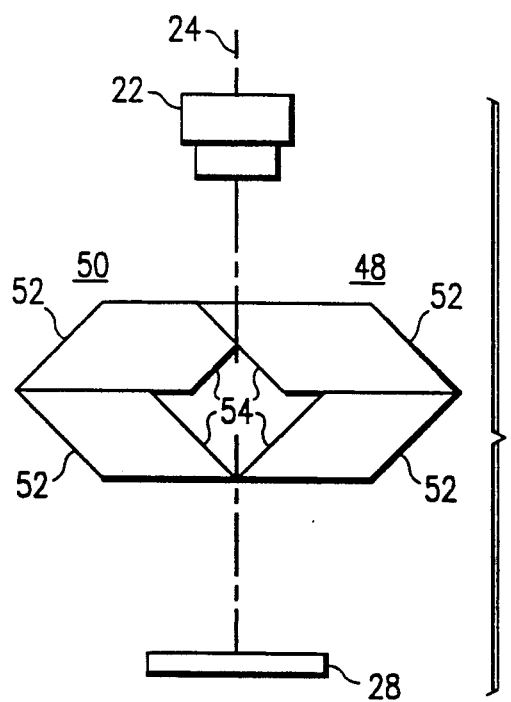
FIG. 8 shows an above view of the optical system shown in FIG. 4.

FIG. 8 shows more clearly how rhomboidal prisms 48 and 50 each are comprised of two smaller rhomboidal prisms joined together. Individual prisms comprising rhomboidal prisms 48 and 50 are constructed with exterior faces 52 and interior faces 54. Interior surfaces 54 are vertical with respect to the boundary plane. Exterior surfaces 52 are angled to cause the beam displacement as depicted in FIG. 5. FIGS. 6 and 7 show a typical inclination of these surfaces towards the boundary plane.

The above assemblies may be connected in series fashion to provide a second or third combining function. For example, four stacked DMDs could be combined with two optical systems to quadruple the size of the projected image.

Although the present invention and its advantages have been described in detail, it should be understood that various changes, substitutions and alterations can be made herein without departing from the spirit and scope of the invention as defined by the appended claims.

What is claimed is:

1. An optical system for combining and projecting two deformable mirror device ("DMD") row images onto an exposure plane, said system comprising:
   a DMD row operable for modulating an impinging light source into a first image;
   a second DMD row operable for modulating an impinging light source into a second image, said second DMD aligned generally parallel to said first DMD; and
   an optical guide for guiding images from said first and second DMD such that said images are projected immediately adjacent to and in a continuous line with one another onto an exposure plane.

2. The optical system of claim 1 wherein said optical guide further comprises:
   an imaging lens forming an axis of projection between said DMD rows and said exposure plane;
   a first pair of reflecting surfaces to separate said DMD images into left and right images projecting along left and right optical paths;
   a second pair of mutually orthogonal reflecting surfaces disposed along said left path for elevating said left image to said axis and reflecting said left image towards said axis;
   a third pair of mutually orthogonal reflecting surfaces disposed adjacent said right path for lowering said right image to said axis and reflecting said right image towards said axis; and
   a fourth pair of reflecting surfaces for directing said reflected left and right images towards said exposure plane.

3. The optical system of claim 2 wherein said first and fourth pairs of reflecting surfaces are the silvered faces of a kite prism.

4. The optical system of claim 3 wherein said second and third pairs of reflecting surfaces are each the silvered faces of a right isosceles prism.

5. The optical system of claim 2 wherein said second and third pairs of reflecting surfaces are each the silvered faces of a right isosceles prism.

6. The optical system of claim 1 wherein said optical guide further comprises:
   an imaging lens for directing said images onto an exposure plane, said lens forming an axis of projection;
   a first reflecting surface disposed on said axis, said surface generally perpendicular to said axis;
   a second reflecting surface adjacent to said first surface, said second reflecting surface disposed generally parallel to said axis and generally orthogonal to said first reflecting surface;
   a partially reflecting partially transparent surface adjacent to said first and second reflecting surface, aligned generally along the plane bisecting the interior angle formed by said first and second surfaces.

7. The optical system of claim 1 wherein said optical guide further comprises:
   an imaging lens forming an axis of projection from said DMD images to said exposure plane;
   a first and second rhomboidal prism aligned along and above said axis; and
   a second and third rhomboidal prism aligned along and below said axis, said second and third rhomboidal prisms disposed below said first and second rhomboidal prisms.

8. An optical system for combining and projecting two DMD images onto an exposure plane, the optical system further comprising:
   an imaging lens forming an axis of projection;
   a first DMD image disposed above said axis of projection;
   a second DMD image disposed below said axis generally parallel to and adjacent to said first DMD image; and
   a guide cooperating with said imaging lens for aligning said first and second DMD images.

9. The system set forth in claim 8 wherein said guide includes:
   a silvered kite prism having a left and right pair of reflecting surfaces, said pairs disposed along a plane of symmetry, said plane of symmetry coinciding with said axis of projection, the intersection of said pairs of surfaces forming four edges, said edges aligned perpendicular to said axis;
   a first right angle isosceles prism disposed adjacent to said left pair of surfaces of said kite prism; and
   a second right angle isosceles prism disposed adjacent said right pair of surfaces of said kite prism.

10. A method of projecting DMD images onto a plane comprising the steps of:
    focusing first and second stacked DMD images along an axis;
    reflecting said first and second DMD images into a left and right optical path;
    redirecting said left and right images towards said axis; and
    combining said left and right images into a single image.

11. The method set forth in claim 10 further comprising the steps of:
    lowering said left image to said axis; and
    raising said right image to said axis;

12. A DMD system having at least two separate DMD pixel arrays each operable for modulating light by each pixel element onto an exposure plane, said system comprising:
    structure for aligning modulated light from each said pixel element parallel to each other; and
    an optical guide for guiding modulated light from each said pixel array such that said light from each said pixel array is projected immediately adjacent to and in a continuous line with one another onto said exposure plane.

13. The DMD system of claim 12 wherein said optical guide further comprises:
    an imaging lens forming an axis of projection between DMD rows and said exposure plane;
    a first pair of reflecting surfaces to separate said DMD images into left and right images projecting along left and right optical paths;
    a second pair of mutually orthogonal reflecting surfaces disposed along said left path for elevating said left image to said axis and reflecting said left image towards said axis;
    a third pair of mutually orthogonal reflecting surfaces disposed adjacent said right path for lowering said right image to said axis and reflecting said right image towards said axis; and
    a fourth pair of reflecting surfaces for directing said reflected left and right images towards said exposure plane.

14. The system of claim 13 wherein said first and fourth pairs of reflecting surfaces are the silvered faces of a kite prism.

15. The system of claim 14 wherein said second and third pairs of reflecting surfaces are each the silvered faces of a right isosceles prism.

16. The system of claim 13 wherein said second and third pairs of reflecting surfaces are each the silvered faces of a right isosceles prism.

17. The system of claim 12 wherein said optical guide further comprises:
   an imaging lens for directing said images onto an exposure plane, said lens forming an axis of projection;
   a first reflecting surface disposed on said axis, said surface generally perpendicular to said axis;
   a second reflecting surface adjacent to said first surface, said second reflecting surface disposed generally parallel to said axis and generally orthogonal to said first reflecting surface;
   a partially reflecting partially transparent surface adjacent to said first and second reflecting surface, aligned generally along the plane bisecting the interior angle formed by said first and second surfaces.

18. The system of claim 12 wherein said optical guide further comprises:
   an imaging lens forming an axis of projection from said DMD images to said exposure plane;
   a first and second rhomboidal prism aligned along and above said axis; and
   a second and third rhomboidal prism aligned along and below said axis, said second and third rhomboidal prisms disposed below said first and second rhomboidal prisms.

19. A method of operating a DMD system having an optical system for combining and projecting two deformable mirror device ("DMD") row images onto an exposure plane, said method comprising the steps of:
   operating a DMD row to modulate an impinging light source into a first image;
   operating a second DMD row to modulate an impinging light source into a second image, said second DMD aligned generally parallel to said first DMD; and
   guiding images from said first and second DMD such that said images are projected immediately adjacent to and in a continuous line with one another onto an exposure plane.

20. The method of claim 19 wherein said guiding step further comprises the steps of:
   forming an axis of projection between said DMD rows and said exposure plane;
   separating said DMD images into left and right images projecting along left and right optical paths;
   elevating said left image to said axis;
   reflecting said left image towards said axis;
   lowering said right image to said axis and reflecting said right image towards said axis; and
   directing said reflected left and right images towards said exposure plane.

* * * * *